United States Patent
Hsieh et al.

(10) Patent No.: US 8,395,663 B2
(45) Date of Patent: Mar. 12, 2013

(54) POSITIONING SYSTEM AND METHOD THEREOF

(75) Inventors: Hsiang-Wen Hsieh, Miaoli County (TW); Jwu-Sheng Hu, Hsinchu (TW); Shyh-Haur Su, Hsinchu County (TW); Chin-Chia Wu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 629 days.

(21) Appl. No.: 12/372,708

(22) Filed: Feb. 17, 2009

(65) Prior Publication Data

US 2010/0157048 A1 Jun. 24, 2010

(30) Foreign Application Priority Data

Dec. 18, 2008 (TW) ................................ 97149542 A (51) Int. Cl.
 H04N 7/18 (2006.01)
(52) U.S. Cl. .................. 348/139; 348/14.02; 348/208.4; 348/211.2; 348/408.1; 348/207.99; 375/240.26; 358/448; 386/344; 382/103
(58) Field of Classification Search .................. 348/139, 348/14.02, 208.4, 211.2, 408.1, 207.99, 208.99, 348/262; 375/240.26; 358/448; 386/344; 382/103
See application file for complete search history.

(56) References Cited

U.S. PATENT DOCUMENTS

| | | | |
|---|---|---|---|
| 6,437,823 B1 | 8/2002 | Zhang | |
| 6,985,175 B2 | 1/2006 | Iwai et al. | |
| 2002/0145667 A1* | 10/2002 | Horiuchi | 348/207.99 |
| 2005/0206739 A1* | 9/2005 | Kamoshida | 348/208.99 |
| 2005/0219642 A1* | 10/2005 | Yachida et al. | 358/448 |
| 2005/0271361 A1* | 12/2005 | Aoki et al. | 386/68 |
| 2008/0154527 A1* | 6/2008 | Staaden et al. | 702/95 |
| 2009/0021614 A1* | 1/2009 | Baker et al. | 348/262 |
| 2009/0027494 A1* | 1/2009 | Cavallaro et al. | 348/135 |
| 2009/0080697 A1* | 3/2009 | Kishikawa et al. | 382/103 |
| 2010/0061591 A1* | 3/2010 | Okada et al. | 382/103 |
| 2010/0166256 A1* | 7/2010 | Kmiecik et al. | 382/103 |

FOREIGN PATENT DOCUMENTS

| TW | 200841674 | 10/2008 |
|---|---|---|
| TW | I347104 | 8/2011 |

OTHER PUBLICATIONS

"Office Action of Taiwan Counterpart Application", issued on Jun. 25, 2012, p. 1-p. 5.

* cited by examiner

*Primary Examiner* — Thoung Nguyen
(74) *Attorney, Agent, or Firm* — Jianq Chyun IP Office (57) ABSTRACT

A positioning system and a method thereof are provided. In the positioning method, a first and a second pose information of a moving device are obtained by a first positioning device and a second positioning device respectively, wherein the first pose information corresponds to the second pose information. In addition, a plurality of first candidacy pose information is generated in an error range of the first pose information. Furthermore, a plurality of second candidacy pose information is generated according to the first pose information respectively. One of the second candidacy pose information having a smallest error derived from the second pose information is selected for updating the pose information of the first positioning device and parameter information of the second positioning device. Thereby, pose information of the moving device is updated and parameter information of the second orientation devices is calibrated simultaneously.

15 Claims, 7 Drawing Sheets

POSITIONING SYSTEM AND METHOD THEREOF

CROSS-REFERENCE TO RELATED APPLICATION

This application claims the priority benefit of Taiwan application serial no. 97149542, filed on Dec. 18, 2008. The entirety of the above-mentioned patent application is hereby incorporated by reference herein and made a part of this specification.

BACKGROUND OF THE INVENTION

1. Field of the Invention

The present invention relates to a positioning technique, and more particularly, to a positioning technique for localizing a moving device.

2. Description of Related Art

Due to rapid progress in technology, the industry develops towards automatization, such that repeated, trivial, and toilful labour intensive work is carried out by automatic machines. With regard to automatic machines, service event is determined by a positioning accuracy. The conventional positioning technique is described below.

For example, a conventional automatic carrier can take goods from a place to another place. The automatic carrier moves by wheels. Further, the automatic carrier is positioned by an odometer and a direction sensor. It should be noted, if the automatic carrier passes through a bumpy road, the odometer and the direction sensor may make errors easily. Over a long period of time, the errors may be accumulated larger and larger, so that the automatic carrier may fail to take goods from a place to another place.

For this reason, in the conventional technology, an environment video camera is provided to help to localize the automatic carrier. First, a calibration of the environment video camera should be carry out to establish corresponding relation between an image reference coordinate and a world reference coordinate. A picture of the automatic carrier can be transformed from the image reference coordinate to the world reference coordinate according to calibration parameters of the video camera so as to achieve the localization of the automatic carrier. It should be noted, calibrations of the environment video camera should be carry out again, when a focus or a visual angle of the environment video camera is changed, so that a efficiency and a elasticity of real operation would be direct influenced. Beside, only using the environment video camera to localize the automatic carrier would be fail or incorrect when the automatic carrier is hidden by an environment object and results in that the automatic carrier can not be viewed by the environment video camera.

SUMMARY OF THE INVENTION

The present invention provides a positioning method which may correct pose (position and orientation) information of a first positioning device and parameters of a second positioning device.

From another aspect, the present invention provides a positioning system which may update pose information of a first positioning device and parameters of a second positioning device dynamically. In addition, a calibration procedure of the second positioning device may not be achieved beforehand.

The present invention provides a positioning method. In the method, a first and a second pose information of a moving device are obtained by a first positioning device and a second positioning device respectively, wherein the first pose information corresponds to the second pose information. In addition, a plurality of first candidacy pose information is generated in an error range of the first pose information. Furthermore, the first candidacy pose information are transformed into a plurality of second candidacy pose information in an image coordinate according to parameters of the second positioning device. Beside, one of the second candidacy pose information having a smallest error derived from the second pose information is selected for updating pose information of the first positioning device so as to correct parameters of the second positioning device.

The present invention provides a positioning system including a first positioning device, a second positioning device, and an operation module. The first positioning device or obtains a first pose information of a moving device. The second positioning device for obtains a second pose information of the moving device, wherein the second pose information corresponds to the first pose information. The operation module receives the first pose information and the second pose information, generates a plurality of first candidacy pose information in an error range of the first pose information, transforms the first candidacy pose information into a plurality of second candidacy pose information in an image coordinate according to parameters of the second positioning device, and selects one of the second candidacy pose information having a smallest error derived from the second pose information so as to update pose information of the first positioning device and then correct parameters of the second positioning device.

The present invention may obtain a first and a second pose information of a moving device from a first positioning device and a second positioning device. In addition, a plurality of first candidacy pose information is generated in an error range of the first pose information. Beside, one of the second candidacy pose information having a smallest error derived from the second pose information transformed from the first candidacy pose information is selected for updating pose information of the first positioning device and parameters of the second positioning device together.

To make the aforesaid features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
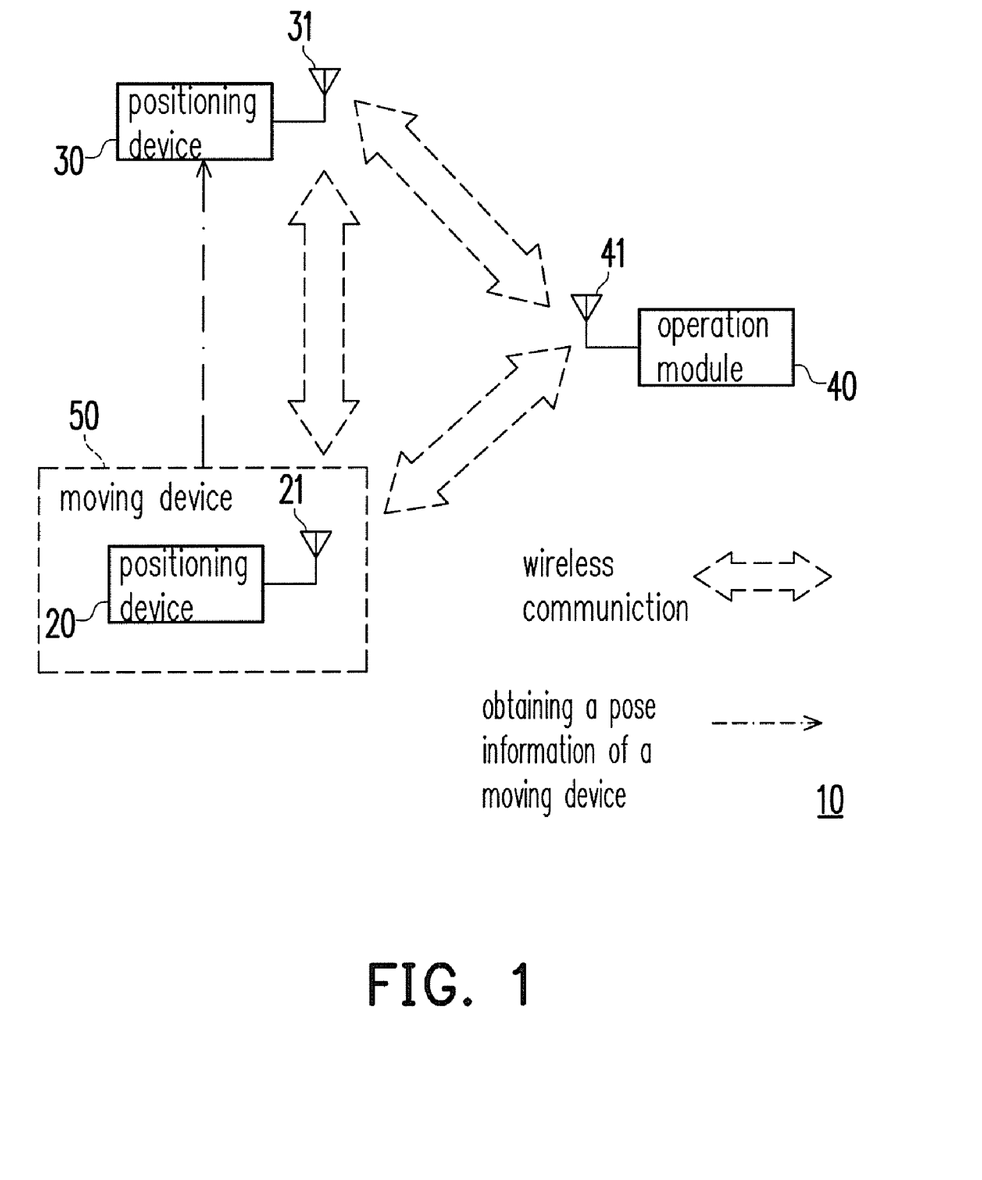
FIG. 1 is a block diagram illustrating a positioning system according to one embodiment of the present invention.

FIG. 1 is a block diagram illustrating a positioning system according to one embodiment of the present invention. Referring to FIG. 1, the positioning system 10 may be used to localize the moving device 50. The positioning system 10 includes positioning devices 20 and 30, and an operation module 40. In the present embodiment, the positioning system 10 may further include wireless communication devices 21, 31, and 41, wherein the wireless communication devices 21, 31, and 41 are electrically connected to the positioning devices 20, 30, and the operation module 40 respectively for communicating mutually.

Figure 2:
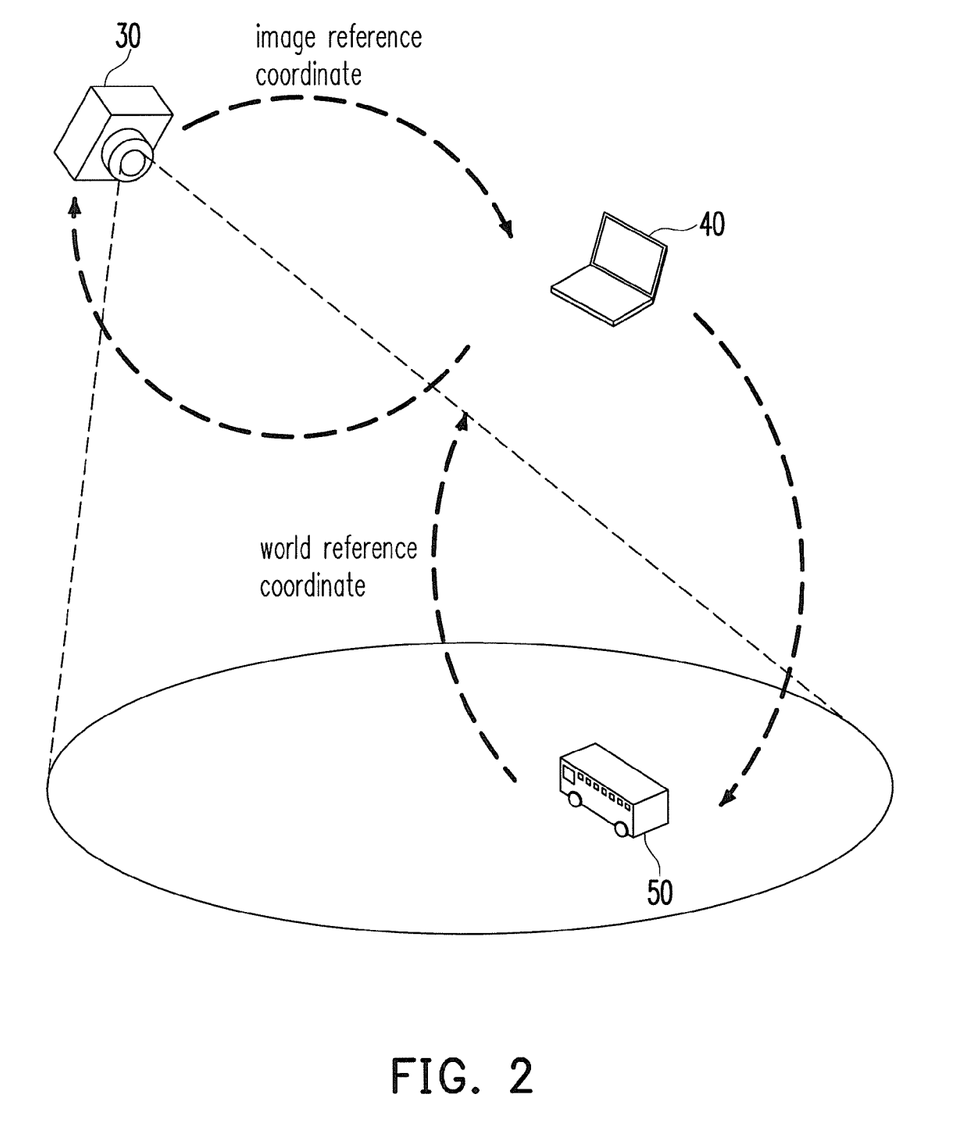
FIG. 2 is a schematic view illustrating a positioning system according to one embodiment of the present invention.

FIG. 2 is a schematic view illustrating a positioning system according to one embodiment of the present invention. Referring to FIG. 1 and FIG. 2, in the present embodiment, the moving device 50 is, for example, a vehicle. The operation module may be disposed in a server. The positioning devices 20 may be disposed in the moving device 50. The positioning devices 20 may include an odometer and a direction sensor, wherein the odometer can record a displacement of the moving device 50, and the direction sensor can sensor a direction of the moving device 50. In other words, the positioning devices 20 can obtain motion information of the moving device 50 by the odometer and the direction sensor. The positioning devices 20 may transmit the motion information to the operation module 40 through the communication devices 21 and 41. The operation module 40 may compute the pose information of the moving device 50 in a world reference coordinate according to a initial position of the moving device 50 in the world reference coordinate, wherein the pose may include a coordinate and direction.

Further, in the present embodiment, the positioning devices 30 is, for example, a video camera. The positioning devices 30 may be disposed in an environment at a distance from the moving device 50 for taking a picture of the moving device 50, wherein the view of the positioning devices 30 covers over a movement range of the moving device 50. It should be noted, a mark mat be disposed on the moving device 50 beforehand to indicate a direction of the moving device 50. The positioning devices 30 may transmit a picture taken from the moving device 50 to the operation module 40 through the communication devices 31 and 41. The operation module 40 may estimate a pose of the moving device 50 in an image reference coordinate according to the picture of the moving device 50. It should be noted, the operation module 40 has a corresponding relation between the image reference coordinate and the world reference coordinate. The corresponding relation may be displayed by parameter information of the positioning device 30. Thereby, the operation module 40 may transform the image reference coordinate and the world reference coordinate to each other according to the parameter information of the positioning device 30. In addition, the operation module 40 further has a sample image of the positioning device 30 to estimate an error range of data provided by positioning device 30. A positioning method is described according to a flowchart as below.

Figure 3:
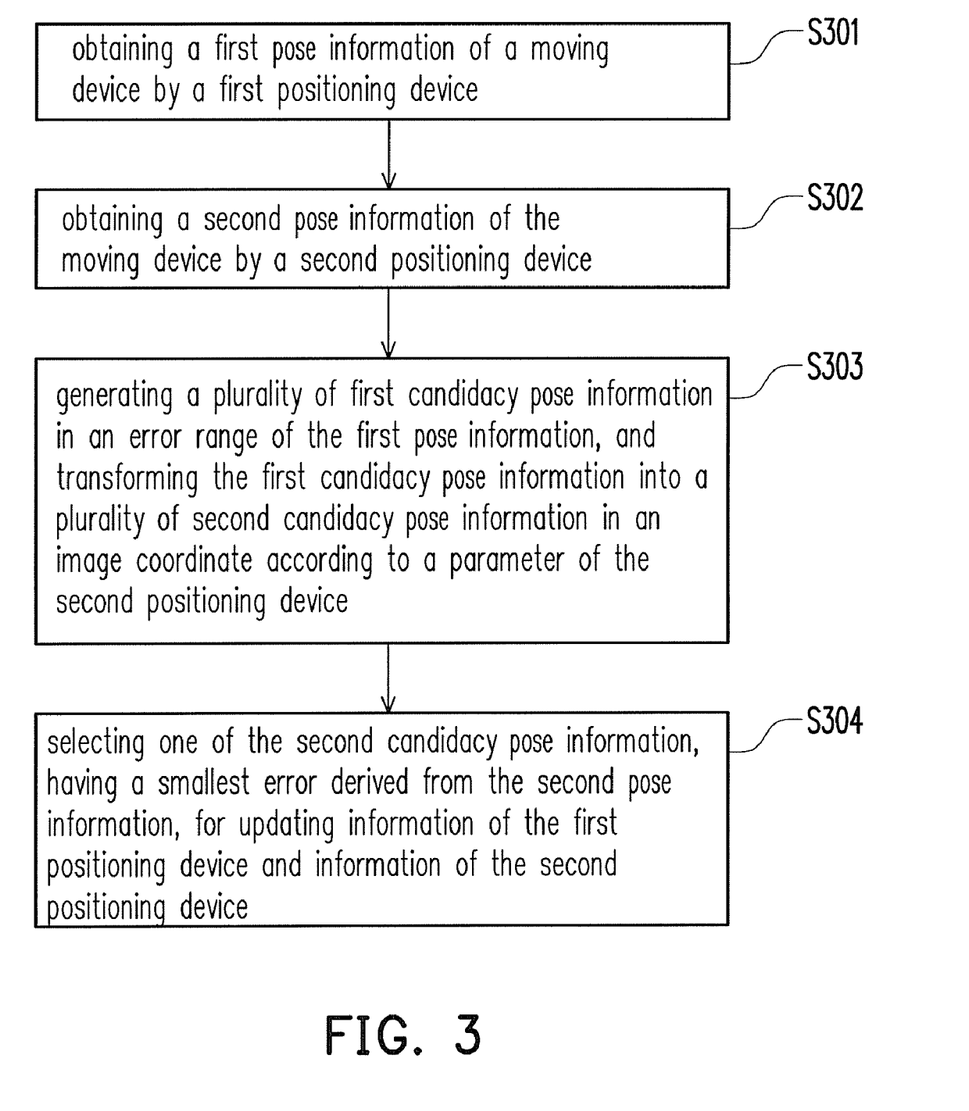
FIG. 3 is a flowchart illustrating a positioning method according to one embodiment of the present invention.
Figure 4:
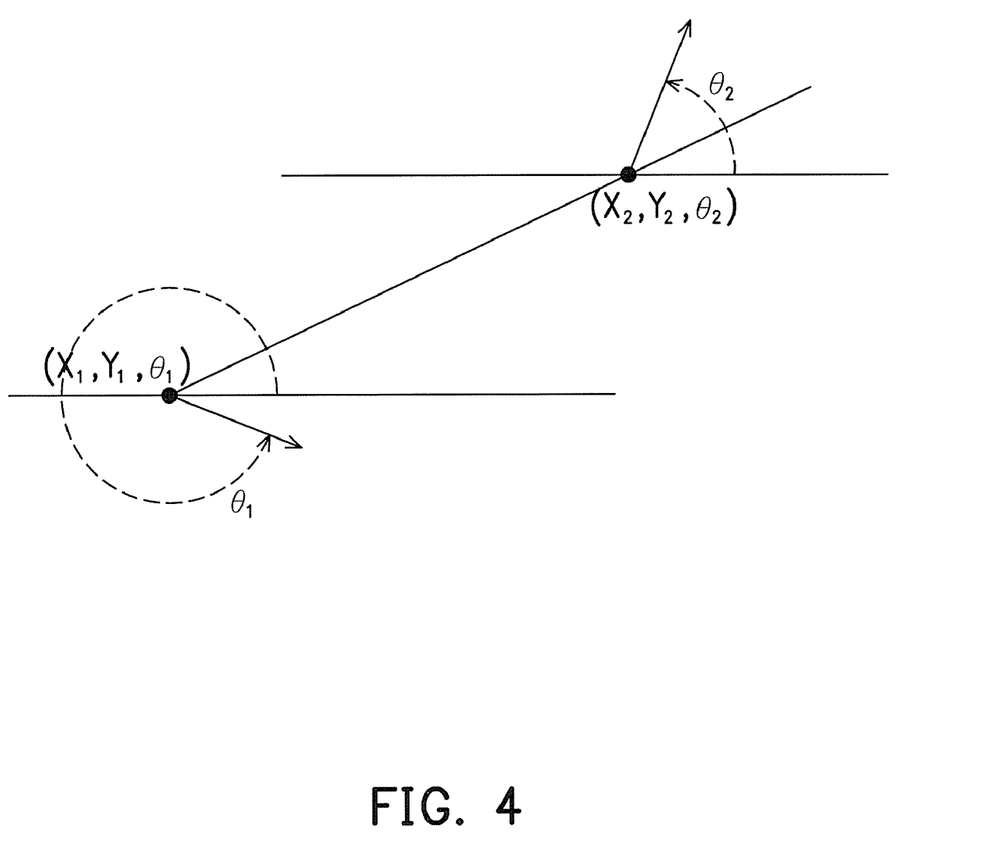
FIG. 4 is a schematic view illustrating a movement of a moving device according to one embodiment of the present invention.

FIG. 3 is a flowchart illustrating a positioning method according to one embodiment of the present invention. FIG. 4 is a schematic view illustrating a movement of a moving device according to one embodiment of the present invention. Referring to FIG. 1, FIG. 3, and FIG. 4, suppose that an initial pose of the moving device 50 in the world reference coordinate is $(X_1, Y_1, \theta_1)$, wherein $X_1$ and $Y_1$ indicate the coordinate of the moving device 50, $\theta_1$ indicates the direction of the moving device 50. In addition, suppose that an initial pose of the moving device 50 in the image reference coordinate is $(U_1, V_1, \alpha_1)$, wherein $U_1$ and $V_1$ indicate the coordinate of the moving device 50, $\alpha_1$ indicates the direction of the moving device 50.

The moving device 50 can be localized by referring the positioning method in the FIG. 3 when the moving device 50 moved. First, the positioning devices 20 is used to obtain a first pose information of the moving device 50 in step S301. For example, the positioning devices 20 can obtain motion information of the moving device 50 by an odometer and a direction sensor. The operation module 40 can obtain the motion information through the communication devices 41 and 21, and compute a moved pose $(X_2, Y_2, \theta_2)$ of the moving device 50 in the world reference coordinate according to the initial position of the moving device 50 in the world reference coordinate and the motion information. In the present embodiment, pose $(X_2, Y_2, \theta_2)$ can be served as the first pose information. It should be noted, the first pose information obtain by the positioning devices 20 may not accurate, because the automatic carrier may be influenced by factors, for example, passing through a bumpy road or vibration.

Then, the positioning devices 30 is used to obtain a second pose information of the moving device 50 in step S302. For example, the positioning devices 30 can take picture of the moving device 50. The operation module 40 can obtain the picture through the communication devices 41 and 31, and compute a moved pose $(U_2, V_2, \alpha_2)$ of the moving device 50 in the image reference coordinate according the picture and to parameter information stored in the positioning devices 30. In the present embodiment, pose $(U_2, V_2, \alpha_2)$ can be served as the second pose information. It should be noted, the second pose information may not accurate also. Thereby, a plurality of first candidacy pose information may be generated according to the first pose information. Then, the first candidacy pose information may be transform into a plurality of second candidacy pose information. One of the second candidacy pose information having a smallest error derived from the second pose information may be selected for updating the pose information of the moving device 50. The detail steps are described as below.

A plurality of candidacy pose information is generated in an error range of the first pose information in step S303. For example, generating a plurality of first candidacy pose information in an error range of the first pose information, and mapping the first candidacy pose information into a plurality of second candidacy pose information. More particular, the operation module 40 generates a plurality of first candidacy pose information at random in an error range, for example $(X_2 \pm \Delta t, Y_2 \pm \Delta t, \theta_2 \pm \Delta s)$, of the pose $(X_2, Y_2, \theta_2)$. In the present embodiment, the amount of the first candidacy pose information is for example one hundred. The first candidacy pose information are $(X_2 \pm ex1, Y_2 \pm ey1, \theta_2 \pm et1)$ to $(X_2 \pm ex100, Y_2 \pm ey100, \theta_2 et100)$ respectively. Due to the pose $(X_2, Y_2, \theta_2)$ may not accurate, an error of the first candidacy pose information generated at random may be greater than a error of the pose $(X_2, Y_2, \theta_2)$. An advantage of generating the first candidacy pose information at random is that the error of the pose $(X_2, Y_2, \theta_2)$ can be simulated objectively.

Figure 5:
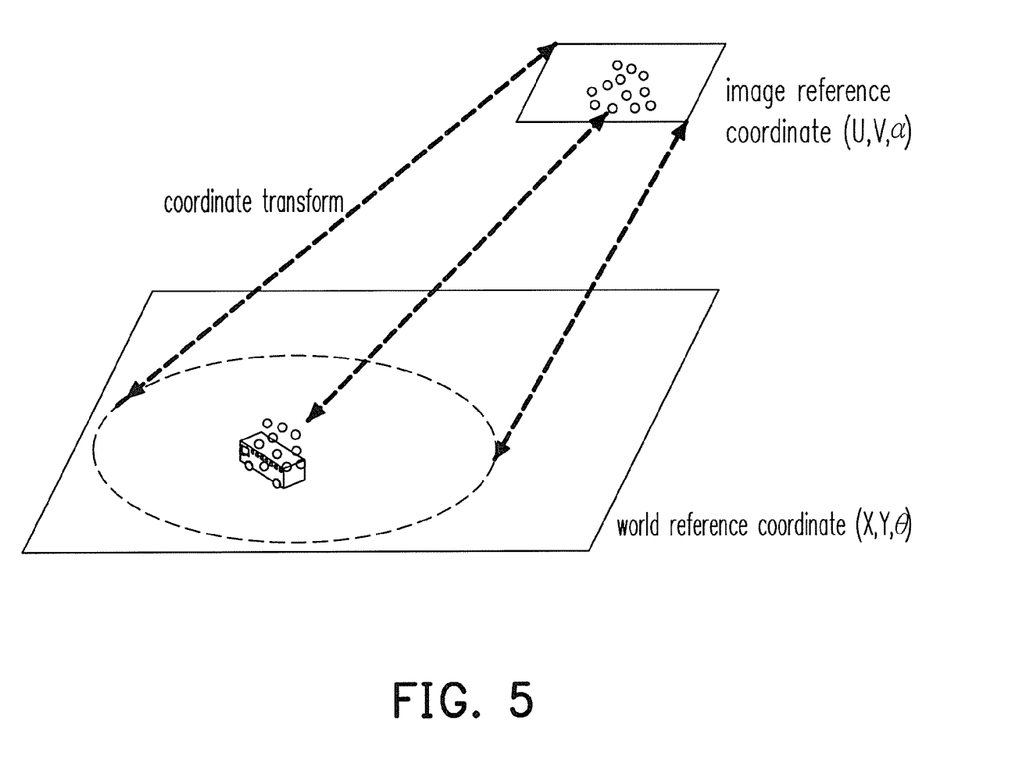
FIG. 5 is a transform schematic view illustrating the world reference coordinate and image reference coordinate according to one embodiment of the present invention.

FIG. 5 is a transformation schematic view illustrating the world reference coordinate and image reference coordinate according to one embodiment of the present invention. Referring to FIG. 5, after following the above steps, the first candidacy pose information in the world reference coordinate is transformed into a plurality of second candidacy pose information in the image reference coordinate according to the parameter information of the positioning device 30 stored in the operation module 40. So, the candidacy pose information $(X_2 \pm ex1, Y_2 \pm ey1, \theta_2 \pm et1)$ to $(X_2 \pm ex100, Y_2 \pm ey100, \theta_2 \pm et100)$ in the world reference coordinate are transformed into candidacy pose information $(U_2 \pm eu1, V_2 \pm ev1, \alpha_2 \pm ea1)$ to $(U_2 \pm eu100, V_2 \pm ev100, \alpha_2 ea100)$ in the image reference coordinate respectively.

In step S304, one of the second candidacy pose information having a smallest error derived from the second pose information is selected for updating the pose information of the first positioning device, for example the positioning devices 20, and parameter information of the second positioning device, for example the positioning devices 30. For example, one of the second candidacy pose information having a smallest error derived from the second pose information is selected for updating the pose information of the positioning device 20 and parameter information of the positioning device 30, and then stored in the operation module 40. More particular, image block corresponding to the candidacy pose information $(U_2 \pm eu1, V_2 \pm ev1, \alpha_2 \pm ea1)$ to $(U_2 \pm eu100, V_2 \pm ev100, \alpha_2 \pm ea100)$ are compared to a moving device sample image stored in the operation module 40 so as to obtain one of the second candidacy pose information having a smallest error derived from the second pose information $(U_2, V_2, \alpha_2)$. Suppose that the second pose information $(U_2 \pm eum, V_2 \pm evm, \alpha_2 \pm eam)$ having the smallest error, wherein $1 \leq m \leq 100$.

Then, the selected second pose information $(U_2 \pm eum, V_2 \pm evm, \alpha_2 \pm eam)$ is transformed into pose information $(X_2 \pm wexm, Y_2 \pm weym, \alpha_2 \pm wetm)$ in the world reference coordinate served as the first pose information to update the first pose information of the first positioning device. In other words, the pose information $(X_2 \pm wexm, Y_2 \pm weym, \alpha_2 \pm wetm)$ shows a localization result of the moving device 50. In addition, the second pose information $(U_2, V_2, \alpha_2)$ is updated according to the pose information $(U_2 \pm eum, V_2 \pm evm, \alpha_2 \pm eam)$. A corresponding relation between the updated the first pose information $(X_2, Y_2, \theta_2)$ and the second pose information $(U_2, V_2, \alpha_2)$ is established. Then the corresponding relation is stored in the operation module 40. It should be noted, a purpose in the step S304 is that one of the second candidacy pose information having a smallest error is selected as final pose of the moving device 50. Beside, the first pose information $(X_2, Y_2, \theta_2)$ and the second pose information $(U_2, V_2, \alpha_2)$ can be used to correct the parameters of the positioning device 30.

Figure 6:
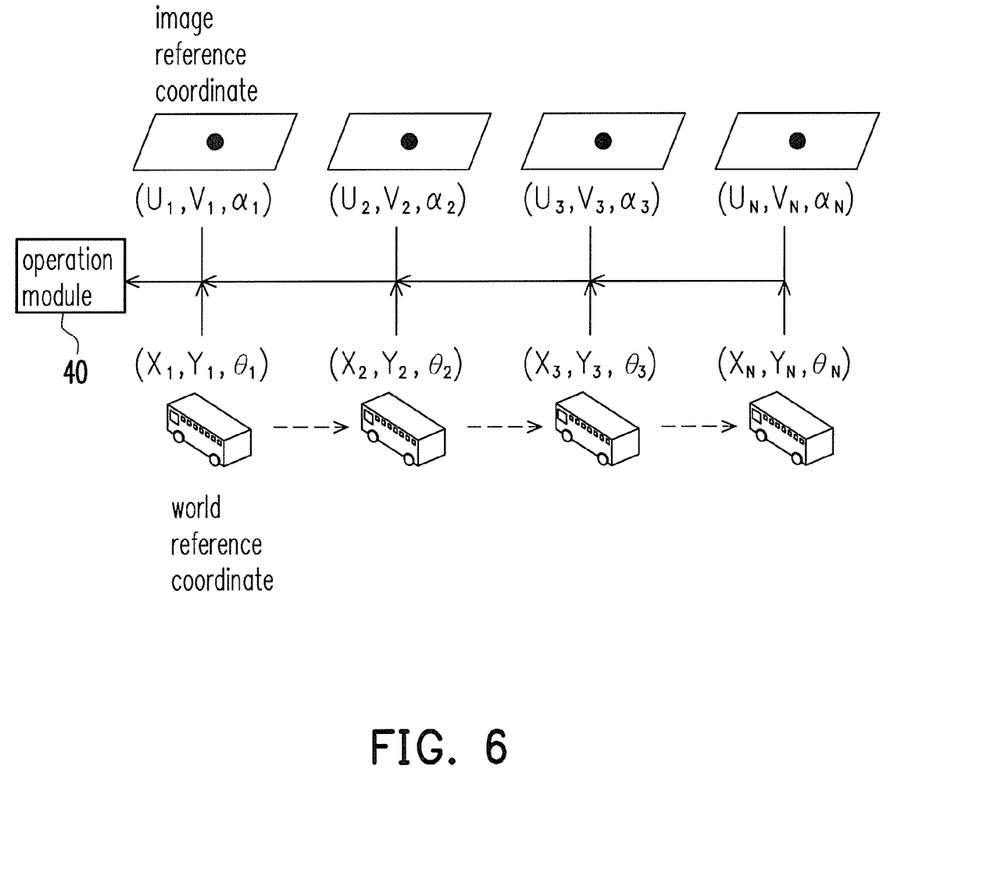
FIG. 6 is a moving schematic view illustrating a moving device according to one embodiment of the present invention.

FIG. 6 is a moving schematic view illustrating a moving device according to one embodiment of the present invention. Referring to FIG. 6, the steps in the FIG. 3 can be repeated to localize the moving device 50 when the moving device 50 moves. N indicates the number of movements of the moving device 50, wherein N is a natural number.

Although the above embodiment has disclosed a possible type of a positioning system and method thereof, it is common sense to persons of ordinary knowledge in this art that different manufacturers may develop different designs of positioning systems and methods thereof, and the application of the present invention should not be limited to this type only. In other words, any method including a first and a second pose information of a moving device are obtained by a first positioning device and a second positioning device respectively, a plurality of first candidacy pose information is generated in an error range of the first pose information, the first candidacy pose information is transformed into image coordinate served as a plurality of second candidacy pose information, and one of the second candidacy pose information having a smallest error derived from the second pose information is selected for updating the information of the first positioning device and information of the second positioning device falls within the spirit of the present invention. Some other embodiments are further discussed hereinafter to allow persons of ordinary skill in the art to comprehend and embody the present invention.

Figure 7:
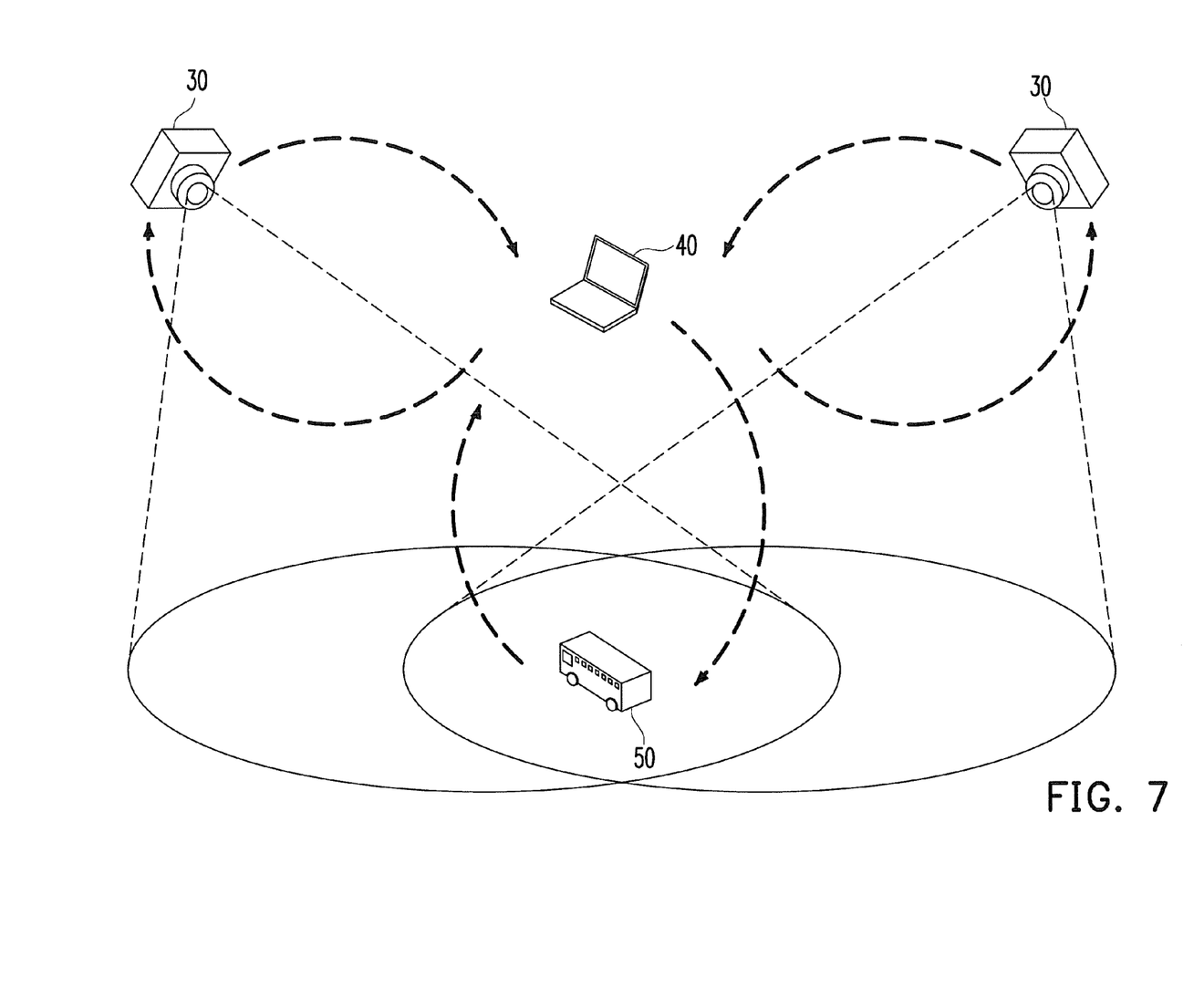
FIG. 7 is a block diagram illustrating a positioning system according to another embodiment of the present invention.

Referring to the FIG. 1 and FIG. 2, in the above embodiment, the positioning devices 30 is merely a video camera, which is not limited by the present invention herein. In other embodiments, the positioning devices 30 can include a plurality of video cameras. For example, FIG. 7 is a block diagram illustrating a positioning system according to another embodiment of the present invention. In the present embodiment, the video cameras cover widespread view. In other words, the positioning devices 30 can localize the moving device 50 when the moving device 50 falls in the view of one of the video cameras. The video cameras can take picture of the moving device 50 with different angle of view positions at the same time when the moving device 50 falls in views of a plurality of video cameras. Therefore, calibrations of the video cameras can be achieved automatically according to the information of the moving device and video cameras step by step, so as to simplify the complex calibration procedures by man in the prior art. The operation module 40 can evaluate the pose of the moving device 50 according to the different angle of views.

Referring to the FIG. 1, in the above embodiment, the operation module 40 is disposed in the server, which is not limited by the present invention herein. For example, in other embodiments, the operation module 40 may be disposed in the moving device coupled to the positioning device 20. The operation module 40 may communicate with the positioning device 30 through the communication devices 21 and 31. Thereby, the cost of the wireless communication devices 41 can be saved. For example again, the operation module 40 may be combined with the positioning device 30. The operation module 40 may communicate with the positioning device 20 through the communication devices 21 and 31. Thereby, the cost of the wireless communication devices 41 can be decreased as well.

Further, in the above embodiment, the step S303 in the FIG. 3, is merely generating a plurality of first candidacy pose information at random in an error range$(X_2 \pm \Delta t, Y_2 \pm \Delta t, \theta_2 \pm \Delta s)$ according to the pose information $(X_2, Y_2, \theta_2)$, which is not limited by the present invention herein. In other embodiments, the error range may be defined according to a moving property of the moving device 50. For example, the error range of the moving device 50 in x direction may be increased and the error range of the moving device 50 in y direction may be decreased when the displacement of the moving device 50 in x direction is larger than the displacement of the moving device 50 in y direction. Similarly, the error range of the moving device 50 in direction may be increased when the rotation angle of the moving device 50 is larger. Thereby, the error can be decreased.

In the above embodiment, a plurality of first candidacy pose information is merely generated at random, which is not limited by the present invention herein. In other embodiments, the o first candidacy pose information may be generated at different method. For example, persons skilled in the art may set a plurality of error estimation tables. Then, one of the error estimation tables is selected to generate the candidacy pose information.

Further, in the above embodiment, the number of the first candidacy pose information and the corresponding second candidacy pose information is one hundred, which is not limited by the present invention herein. In other embodiments, persons skilled in the art may determine the number of the first candidacy pose information and the second candidacy pose information according to requirements.

In addition, in the above embodiment, the moving device 50 is merely a vehicle, which is not limited by the present invention herein. In other embodiments, the moving device 50 may be a moving carrier, a moving platform, a moving robot, a member wearing a displacement sensor or a velocity sensor. More particular, persons skilled in the art may achieve the update of the moving device 50 in real time according to the steps disclosed in the FIG. 3.

Referring to the FIG. 1, parameter information of the positioning devices 30 may be obtained according to a corresponding relation between a pose information obtained by the positioning devices 20 and the coordinate of the moving device 50 in the image reference coordinate.

In the above embodiment, the positioning devices 20 merely may include an odometer and a direction sensor a vehicle, which is not limited by the present invention herein. In other embodiments, the positioning devices 20 may include a speedometer and a timer to substitute for the odometer.

In summary, the present invention may obtain a first and a second pose information of a moving device from a first positioning device and a second positioning device. In addition, a plurality of first candidacy pose information is generated in an error range of the first pose information. Beside, one of the second candidacy pose information having a smallest error derived from the second pose information transformed from the first candidacy pose information is selected for updating pose information of the first positioning device and parameters of the second positioning device together.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A positioning method, for an operation module, the method comprising:
   communicating with a first positioning device and a second positioning device by the operation module via a wireless communication device, wherein the first positioning device is disposed in a moving device and the second positioning device is disposed at a first distance from the moving device;
   obtaining a first pose information of the moving device by the first positioning device, wherein the first position device is configured to detect a direction and a displacement of the moving device in a world reference coordinate and the first pose information is in the world reference coordinate;
   obtaining a second pose information of the moving device by the second positioning device, wherein the second positioning device is configured to capture at least a picture of the moving device, the second pose information in an image reference coordinate is estimated by the picture of the moving device, and the second pose information corresponds to the first pose information;
   determining an error range, increasing the error range in a first direction and decreasing the error range in a second direction if the displacement of the moving device in the first direction is larger than the displacement of the moving device in the second direction;
   generating a plurality of first candidacy pose information randomly in the world reference coordinate, wherein the distance between the first pose information and each of the first candidacy pose information is within the error range of the first pose information, and transforming the plurality of the first candidacy pose information into a plurality of second candidacy pose information in the image reference coordinate according to parameters of the second positioning device, wherein the parameters of the second position device comprises a corresponding relation between the image reference coordinate and the world reference coordinate; and
   obtaining an error between the second pose information and each of the plurality of the second candidacy pose information and selecting one of the second candidacy pose information, having a smallest error among the errors, for updating information of the first positioning device and parameter information of the second positioning device.

2. The positioning method according to claim 1, wherein the first pose information and the second pose information comprise a coordinate or a moving direction of the moving device.

3. The positioning method according to claim 1, wherein the error range is associated with a moving property of the moving device.

4. The positioning method according to claim 1, wherein the first positioning device disposed in the moving device compries a displacement sensor for sensing the displacement of the moving device.

5. The positioning method according to claim 1, wherein the second positioning device compries a video camera at the first distance from the moving device for taking the picture of the moving device.

6. The positioning method according to claim 1, wherein the moving device is a moving carrier, a moving platform, a moving robot, a member wearing a displacement sensor or a velocity sensor.

7. A positioning system, comprising:
   a first positioning device, disposed in a moving device, for obtaining a first pose information of the moving device, wherein the first position device is configured to detect a direction and a displacement of the moving device in a world reference coordinate and the first pose information is in the world reference coordinate;
   a second positioning device, disposed at a first distance from the moving device, for obtaining a second pose information of the moving device, wherein the second positioning device is configured to capture at least a picture of the moving device, the second pose information in an image reference coordinate is estimated by the picture of the moving device, and the second pose information corresponds to the first pose information; and
   an operation module, for communicating with the first positioning device and the second positioning device via a wireless communication device, receiving the first pose information and the second pose information, determining an error range, increasing the error range in a first direction and decreasing the error range in a second direction if the displacement of the moving device in the first direction is larger than the displacement of the moving device in the second direction,
   wherein the operation module is further configured for generating a plurality of first candidacy pose information randomly in the world reference coordinate, wherein the distance between the first pose information and each of the first candidacy pose information is within the error range, transforming the plurality of the first candidacy pose information into a plurality of second candidacy pose information in the image reference coordinate according to parameters of the second positioning device, obtaining an error between the second pose information and each of the plurality of the second candidacy pose information and selecting one of the second candidacy pose information having a smallest error among the errors so as to update information of the first positioning device and information of the second positioning device, wherein the parameters of the second position device comprises a corresponding relation between the image reference coordinate and the world reference coordinate.

8. The positioning system according to claim 7, wherein the first pose information and the second pose information comprise a coordinate or a moving direction of the moving device.

9. The positioning system according to claim 7, wherein the error range is associated with a moving property of the moving device.

10. The positioning system according to claim 7, wherein the first positioning device disposed in the moving device compries a displacement sensor for sensoring the displacement of the moving device.

11. The positioning system according to claim 7, wherein the first positioning device is disposed in the moving device compries a direction sensor for sensoring the direction of the moving device.

12. The positioning system according to claim 7, wherein the first positioning device compries a second wireless communication device for communicating with the second positioning device and the operation module.

13. The positioning system according to claim 7, wherein the second positioning device compries a video camera at the first distance from the moving device for taking the picture of the moving device.

14. The positioning system according to claim 7, wherein the second positioning device compries a third wireless communication device for communicating with the first positioning device and the operation module.

15. The positioning system according to claim 7, wherein the moving device is a moving carrier, a moving platform, a moving robot, a member wearing a displacement sensor or a velocity sensor.

* * * * *